United States Patent
Morganson et al.

(10) Patent No.: US 11,052,606 B2
(45) Date of Patent: Jul. 6, 2021

(54) PLATFORM DROP SENSOR

(71) Applicant: Hamilton Sundstrand Corporation, Charlotte, NC (US)

(72) Inventors: David W. Morganson, Marlborough, CT (US); Eric M. Raffia, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 313 days.

(21) Appl. No.: 16/201,557

(22) Filed: Nov. 27, 2018

(65) Prior Publication Data
US 2020/0164578 A1   May 28, 2020

(51) Int. Cl.
| | |
|---|---|
| *B33Y 10/00* | (2015.01) |
| *B29C 64/245* | (2017.01) |
| *B33Y 50/02* | (2015.01) |
| *B29C 64/393* | (2017.01) |
| *B33Y 30/00* | (2015.01) |
| *B29C 64/153* | (2017.01) |

(52) U.S. Cl.
CPC .......... *B29C 64/245* (2017.08); *B29C 64/153* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/245; B29C 64/153; B29C 64/393; B33Y 10/00; B33Y 30/00; B33Y 50/02
USPC ....................................................... 700/117
See application file for complete search history.

(56) References Cited

U.S. PATENT DOCUMENTS

| | | | |
|---|---|---|---|
| 8,153,182 B2 | 4/2012 | Comb et al. | |
| 9,903,781 B2 | 2/2018 | Drescher et al. | |
| 9,931,697 B2 | 4/2018 | Levin et al. | |
| 9,989,495 B2 * | 6/2018 | Gold | G01N 29/02 |
| 10,035,304 B2 | 7/2018 | Reinarz | |
| 10,821,674 B2 * | 11/2020 | Wasmer | G01N 29/14 |
| 2016/0325541 A1 | 11/2016 | Lavrentyev et al. | |

(Continued)

FOREIGN PATENT DOCUMENTS

| | | |
|---|---|---|
| EP | 3170591 A1 | 5/2017 |
| EP | 3170592 A1 | 5/2017 |

(Continued)

OTHER PUBLICATIONS

Extended European Search Report for EP Application No. 19207466.4, dated Mar. 31, 2020, 8 pages.

(Continued)

*Primary Examiner* — Michael J Brown
(74) *Attorney, Agent, or Firm* — Kinney & Lange, P.A.

(57) ABSTRACT

A method of detecting a malfunction event in an additive manufacturing system includes building a workpiece with the additive manufacturing system. The additive manufacturing system includes a housing, a build chamber disposed within the housing, a recoater disposed within the build chamber, a build platform configured to receive the workpiece, a shaft mounted to the build platform, a sensor in operable communication with the additive manufacturing system, and an actuating mechanism engaged with the shaft such that the actuating mechanism is configured to move the shaft relative to the actuating mechanism. The undesirable event is sensed with the sensor.

14 Claims, 2 Drawing Sheets

(56) References Cited

U.S. PATENT DOCUMENTS

| | | |
|---|---|---|
| 2017/0028703 A1 | 2/2017 | Xu |
| 2018/0154484 A1 | 6/2018 | Hall |
| 2018/0186095 A1 | 7/2018 | Yang |
| 2018/0200964 A1* | 7/2018 | Rockstroh ........... B28B 17/0081 |

FOREIGN PATENT DOCUMENTS

| | | |
|---|---|---|
| WO | WO2017/194110 A1 | 11/2017 |
| WO | WO2018/136071 A1 | 7/2018 |

OTHER PUBLICATIONS

Communication Pursuant to Article 94(3) EPC for EP Application No. 19207466.4, dated Mar. 4, 2021, 5 pages.

\* cited by examiner

PLATFORM DROP SENSOR

BACKGROUND

The present disclosure generally relates to additive manufacturing. In particular, the present disclosure relates to a method of detecting undesirable events in an additive manufacturing system.

Powder bed fusion is a type of additive manufacturing that can include a recoater (hard or soft) pushing a loose layer of powdered material onto a build platform. An energy source (e.g., laser) melts a cross section of a three-dimensional object as a sheet of inert gas (e.g., argon) is directed over the layer of powdered material to enable melting and re-solidification of the powdered material. The build platform is dropped a prescribed amount and the process is repeated over several iterations, resulting in a solid three-dimensional object fabricated through successive melted and cooled layers that are surrounded by un-melted (or un-sintered) loose powder.

A desired characteristic set of the build process often includes an uninterrupted, controlled movement of the object on the build platform. This provides for control and logging of feedback regarding movement of the object and the build platform. Controlling and logging of positioning feedback is important for documenting build quality and for preventing machine damage.

Occasionally during such movement, an undetected binding occurs and/or a backlash of movement is released suddenly. Such events add variability to the build process that can change throughout the duration of the build process potentially causing defects in the as-built part and/or damage to equipment.

SUMMARY

A method of detecting a malfunction event in an additive manufacturing system includes building a workpiece with the additive manufacturing system. The additive manufacturing system includes a housing, a build chamber disposed within the housing, a recoater disposed within the build chamber, a build platform configured to receive the workpiece, a shaft mounted to the build platform, a sensor in operable communication with the additive manufacturing system, and an actuating mechanism engaged with the shaft such that the actuating mechanism is configured to move the shaft relative to the actuating mechanism. The undesirable event is sensed with the sensor.

A system configured to detect an undesirable event during an additive manufacturing operation includes a housing, a build chamber, a recoater, a build platform, a shaft, and actuating mechanism, and an acoustic sensor. The build chamber is disposed within the housing. The recoater is disposed within the build chamber. The build platform is configured to receive a workpiece. The shaft is mounted to the build platform. The actuating mechanism is engaged with the shaft such that the actuating mechanism is configured to move the shaft relative to the actuating mechanism. The acoustic sensor is mounted to another component of the system. The system is configured to identify an occurrence of a sonic pulse signal emitted by the actuating mechanism and to determine whether the sonic pulse signal emitted by the actuating mechanism is outside of a threshold range. A sonic signal that is outside of the threshold range includes a level indicative of the undesirable event.

The present summary is provided only by way of example, and not limitation. Other aspects of the present disclosure will be appreciated in view of the entirety of the present disclosure, including the entire text, claims, and accompanying figures.

Figure 1:
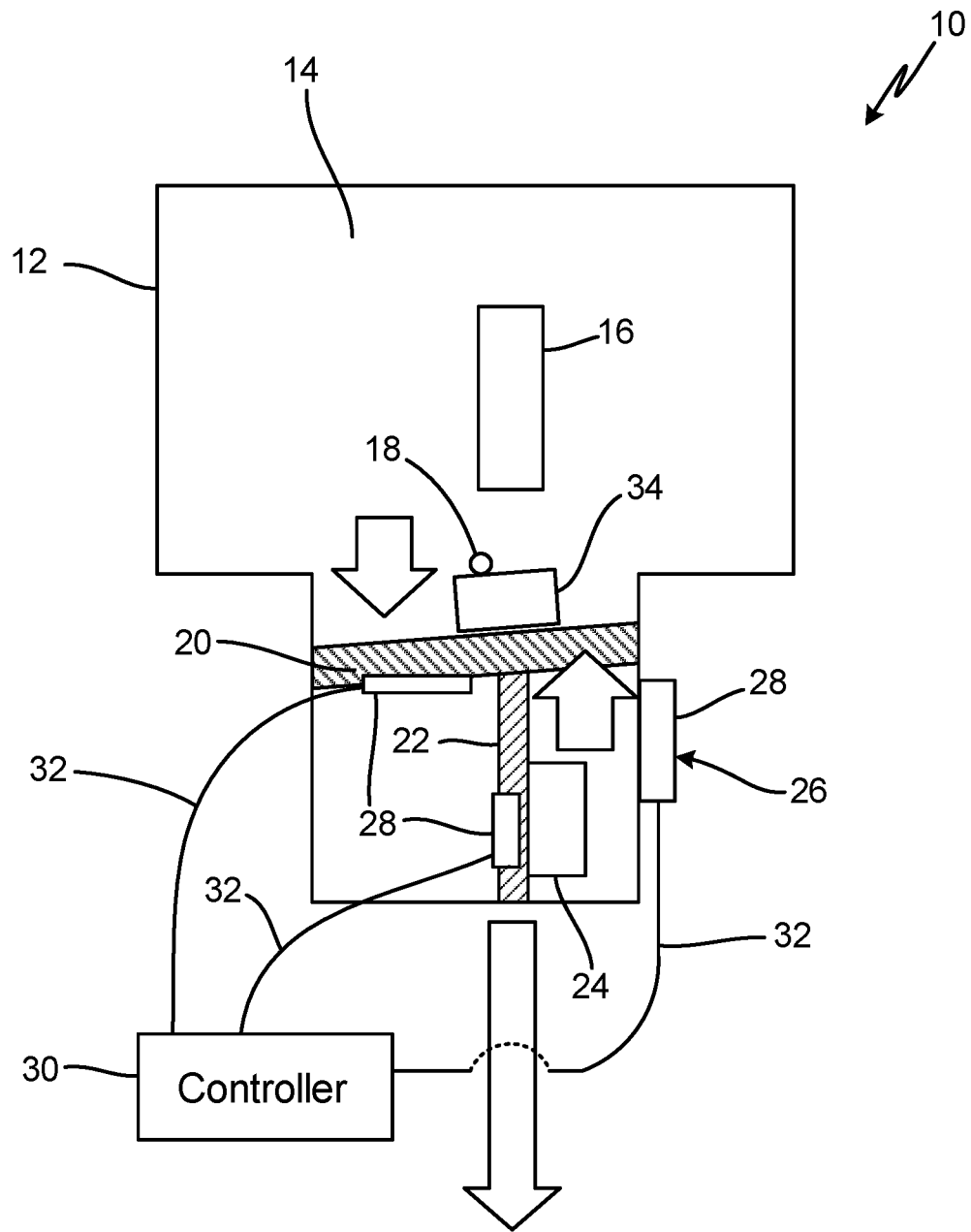
FIG. 1 is a schematic side view of an additive manufacturing system with a build chamber, a build platform, and a sensor array.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a simplified side view of additive manufacturing system 10 and shows housing 12, build chamber 14, energy source 16, recoater 18, build platform 20, shaft 22, actuating mechanism 24, sensor array 26, sensors 28, controller 30, wires 32, and workpiece 34. Workpiece 34 is a substrate or a part subject to a layer-by-layer additive manufacturing process effectuated by additive manufacturing system 10.

Additive manufacturing system 10 is a system for building workpiece 34 with a layer-by-layer additive manufacturing process. In some non-limiting embodiments, additive manufacturing system 10 can be configured for laser additive manufacturing, laser powder bed fusion, electron beam powder bed fusion, laser powder deposition, electron beam wire, and/or selective laser sintering to create a three-dimensional object out of powdered material.

Housing 12 is a hollow container defining build chamber 14. Build chamber 14 is a containment area disposed to receive workpiece 34. In one non-limiting embodiment, build chamber 14 is at least partially filled with an inert gas, such as argon. Energy source 16 is an energy emitter. Recoater 18 is a wiper that can include a knife blade or a roller. Build platform 20 is a working substrate for workpiece 34, and can for example be a flat surface of solid material. Shaft 22 is reciprocatable drive element such as a thin, straight bar or piston of solid material. Actuating mechanism 24 is an apparatus for causing motion, and specifically an apparatus capable of translating shaft 22 so as to adjust a position of build platform 20 relative to housing 12. In some non-limiting embodiments, actuating mechanism 24 can include gears or threads. Sensor array 26 is a group of sensors 28.

Sensors 28 are devices that detect and/or measure a physical property such as sound. In this non-limiting embodiment, sensors 28 include acoustic sensors. In other non-limiting embodiments, sensors 28 can include other types of sonic sensors such as ultrasound or sonar sensors, or microphone. In yet other non-limiting embodiments, sensors 28 can include other types of sensors such as sensors for measuring linear displacement (e.g., linear variable differential transformer). In at least some embodiments, sensors 28 monitor for a threshold range (e.g., in decibels) of sound wave amplitude indicating a sudden drop or release of a bound component of actuating mechanism 24. For example, the threshold range can include a decibel range with lower and upper limits defined by minimum and maximum decibel limits, respectively and such that a sonic pulse signal with a measured decibel level greater than the upper limit of the decibel range is indicative of the undesirable event. In another non-limiting embodiment, sensors 28 monitor for a threshold range of acoustic frequency (and/or characteristic sound wave curve) indicating a sudden drop or release of a bound component of actuating mechanism 24. For example, the threshold range can include a frequency range with lower and upper limits such that a sonic pulse signal with a measured frequency outside of the decibel range is indicative of the undesirable event. In some embodiments, separate sensors 28 can perform different sensing functions, e.g. with a subset of sensory array 26 sensing acoustic frequency, and another subset sensing acoustic amplitude.

Controller 30 is an electronic device that can be or include a programmable logic controller, a personal computer, a digitally controlled device, and/or an analog controlled device. Wires 32 are electrically connecting elements for the transmission of electrical signals.

Build chamber 14 is formed by and is contained within housing 12. In this non-limiting embodiment, build chamber 14 includes a portion of the space inside of housing 12 that is located above a top surface of build platform 20 (as shown in FIG. 1). Energy source 16 is disposed within build chamber 14. In this non-limiting embodiment, energy source 16 is mounted to a moveable and/or translated arm (not shown). Recoater 18 is disposed within build chamber 14 and is configured to move relative to build platform 20. Build platform 20 is mounted on an end of shaft 22. Shaft 22 is disposed within a lower portion of housing 12 and is dynamically engaged with actuating mechanism 24. Actuating mechanism 24 is disposed within the lower portion of housing 12 and is dynamically engaged with shaft 22.

Sensor array 26 of sensors 28 is positioned within housing 12. Each of sensors 28 is mounted to a different component or set of components within the lower portion of housing 12. In the illustrated embodiment, separate sensors 28 are mounted to a lower surface of build platform 20, to a sidewall of the lower portion of housing 12, and to shaft 22, respectively. Controller 30 is disposed outside of housing 12 and is electrically connected to energy source 16, recoater 18, actuating mechanism 24, and sensors 28 of sensor array 26. Wires 32 connect controller 30 to different components of additive manufacturing system 10 such as energy source 16, recoater 18, actuating mechanism 24, and sensors 28 of sensor array 26. Workpiece 34 is positioned on an upper surface of build platform 20.

Additive manufacturing system 10 is system of components for building an object or workpiece via layer-by-layer additive manufacturing. A type of additive manufacturing system 10 can include laser powder bed fusion, directed energy deposition, cold spray, electron beam, fused deposition modeling, or any other layer-by-layer additive manufacturing process. Housing 12 contains the inert gas within housing 12 and houses energy source 16, recoater 18, build platform 20, shaft 22, actuating mechanism 24, sensor array 26, sensors 28, controller 30, and workpiece 34. Build chamber 14 provides a hermetically sealed environment to provide consistent conditions (e.g., temperature, pressure, gas composition, etc.) throughout the build process.

Energy source 16 emits a source of radiation such as an electron beam or laser that is used to melt a layer of power which is solidified to form a layer of workpiece 34. Recoater 18 is dragged across a layer of powder on build platform to wipe a portion of the powder from workpiece 34. Build platform 20 holds and moves workpiece 34 into variable positions (e.g., heights) in accordance with build instructions from controller 30. Shaft 22 pushes build platform 20 in upward and/or downward directions (e.g., up and down as oriented in FIG. 1).

Actuating mechanism 24 is engaged with shaft 22 such that actuating mechanism 24 is configured to move shaft 22 relative to actuating mechanism 24. Actuating mechanism 24 drives movement/motion of shaft 22 which in turn drives the movement of build platform 20. In some non-limiting embodiments, actuating mechanism 24 can be electro-magnetically, pneumatically, or hydraulically driven.

Sensors 28 of sensor array 26 sense a sound level within the lower portion of housing 12. Sensors 28 also identify an occurrence of a sonic pulse signal emitted by actuating mechanism 24 based on the sensed sound level. Controller 30 sends and receives electrical signals via wires 32 to and from components of additive manufacturing system 10 such as energy source 16, recoater 18, actuating mechanism 24, and sensors 28 of sensor array 26. Wires 32 transmit electrical signals between various components of additive manufacturing system 10.

Figure 2:
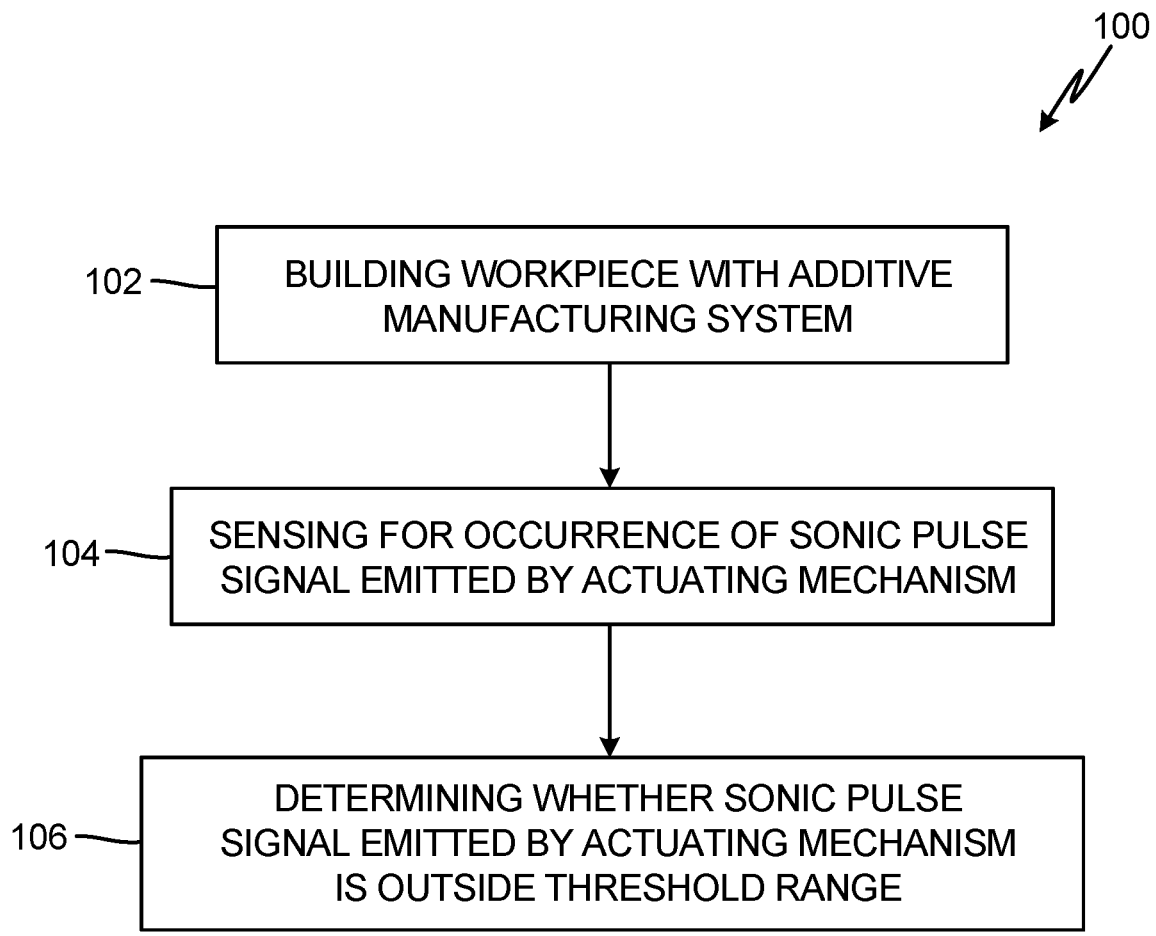
FIG. 2 is a flowchart of a method of detecting an undesirable event in an additive manufacturing system.

FIG. 2 is a flowchart of method 100 of detecting a malfunction event in additive manufacturing system 10.

In this non-limiting embodiment, additive manufacturing system 10 executes a build process of layer-by-layer additive manufacturing (step 102) that includes depositing a first layer of powdered material onto an upper surface of build platform 20. Energy is applied to the first layer of powdered material which is melted. The first layer of powered material is solidified into a first solid layer of material. Build platform 20 is then lowered before a second layer of powdered material is deposited onto the first solid layer of material. These steps are repeated until workpiece 34 is completed.

Sensing array 26 of sensors 28 senses a sound level within housing 12 and identifies an occurrence of a sonic pulse signal emitted by actuating mechanism 24 based on the sensed sound level (step 104). Controller 30 then determines whether the sonic pulse signal emitted by actuating mechanism 24 is outside of a threshold range (e.g., of amplitude and/or frequency) indicative of an undesirable event (step 106). The undesirable event can include contact between recoater 18 and workpiece 34, a drop of shaft 22 relative to actuating mechanism 24, and/or an un-biding of two bound components of actuating mechanism 24.

In other non-limiting embodiments, the occurrence of the sonic pulse signal can be logged after the sonic pulse signal is determined to be over the threshold value. The height of build platform 20 can be adjusted to account for a change in height of build platform 22 caused by the undesirable event. Additionally, at least one of workpiece 34, build platform 22, and actuating mechanism 24 can be visually inspected to determine if at least one of workpiece 34, build platform 20, and actuating mechanism 24 is in an irregular state. Further, at least one of whether workpiece 34 is misshapen, whether build platform 24 is out of position, and whether a component of actuating mechanism 24 is misaligned can be determined.

In existing additive manufacturing systems, an undetected binding or backlash of the build platform actuating mechanism can occur due to the substrate movement mechanisms and process. Here, additive manufacturing system 10 with sensors 28 provides the benefit of ensuring part quality by logging undesirable events during the build process. Further benefits include protection from machine damage, removal of variability in part quality, enabling consistent material properties, and detection of unplanned layer thickness changes, all of which are circumstances that existing technologies can miss.

Discussion of Possible Embodiments

The following are non-exclusive descriptions of possible embodiments of the present invention.

A method of detecting a malfunction event in an additive manufacturing system includes building a workpiece with the additive manufacturing system. The additive manufacturing system includes a housing, a build chamber disposed within the housing, a recoater disposed within the build chamber, a build platform configured to receive the workpiece, a shaft mounted to the build platform, a sensor in operable communication with the additive manufacturing system, and an actuating mechanism engaged with the shaft such that the actuating mechanism is configured to move the shaft relative to the actuating mechanism. The undesirable event is sensed with the sensor.

The method of the preceding paragraph can optionally include, additionally and/or alternatively, any one or more of the following steps, features, configurations and/or additional components.

The sensor can comprise an acoustic sensor; and/or sensing the undesirable event with the sensor can comprise: sensing a sound level with the acoustic sensor; identifying, from the sensed sound level, an occurrence of a sonic pulse signal emitted by the actuating mechanism; and/or determining, with a controller, whether the sonic pulse signal emitted by the actuating mechanism is outside of a threshold range, wherein a sonic signal that is outside of the threshold range can comprise a level indicative of the undesirable event.

The building of the workpiece can be paused after the undesirable event is determined based on the sensed sonic pulse signal from the actuating mechanism.

The occurrence of the sonic pulse signal can be logged after the sonic pulse signal is determined to be over the threshold value.

The height of the build platform can be adjusted to account for a change in height of the build platform caused by the undesirable event.

At least one of the workpiece, the build platform, and/or the actuating mechanism can be visually inspected to determine if the at least one of the workpiece, the build platform, and/or the actuating mechanism is in an irregular state.

At least one of whether the workpiece is misshapen, whether the build platform is out of position, and/or whether a component of the actuating mechanism is misaligned can be determined.

The sensor can be mounted to at least one of the shaft, a sidewall of the housing, and/or a first surface of the build platform that can be opposite from a second surface of the build platform that can be in contact with the workpiece.

The undesirable event can comprise at least one of a contact between the recoater and the workpiece, a drop of the shaft relative to the actuating mechanism, and/or an un-biding of two bound components of the actuating mechanism.

The threshold range can comprise a decibel range with lower and upper limits; a maximum decibel level can define the upper limit of the decibel range; and/or a sonic pulse signal with a measured decibel level greater than the upper limit of the decibel range can be indicative of the undesirable event.

The threshold range can comprise a frequency range with lower and upper limits, and/or a sonic pulse signal with a measured frequency outside of the decibel range can be indicative of the undesirable event.

A system configured to detect an undesirable event during an additive manufacturing operation includes a housing, a build chamber, a recoater, a build platform, a shaft, and actuating mechanism, and an acoustic sensor. The build chamber is disposed within the housing. The recoater is disposed within the build chamber. The build platform is configured to receive a workpiece. The shaft is mounted to the build platform. The actuating mechanism is engaged with the shaft such that the actuating mechanism is configured to move the shaft relative to the actuating mechanism. The acoustic sensor is mounted to another component of the system. The system is configured to identify an occurrence of a sonic pulse signal emitted by the actuating mechanism and to determine whether the sonic pulse signal emitted by the actuating mechanism is outside of a threshold range. A sonic signal that is outside of the threshold range includes a level indicative of the undesirable event.

The system of the preceding paragraph can optionally include, additionally and/or alternatively, any one or more of the following features, configurations and/or additional components.

A controller can be in electric communication with the recoater, the actuating mechanism, and/or the acoustic sensor.

The controller can determine whether the sonic pulse signal emitted by the actuating mechanism is outside of the threshold range.

The acoustic sensor can be mounted to at least one of the shaft, a sidewall of the housing, and/or a first surface of the build platform.

The threshold range can comprise a decibel range with lower and upper limits; a maximum decibel level can define the upper limit of the decibel range; and/or a sonic pulse signal with a measured decibel level greater than the upper limit of the decibel range can be indicative of the undesirable event.

The threshold range can comprise a frequency range with lower and upper limits, and/or a sonic pulse signal with a measured frequency outside of the decibel range can be indicative of the undesirable event.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of monitoring an additive manufacturing system, the method comprising:
   constructing a workpiece with the additive manufacturing system, wherein the additive manufacturing system comprises:
   a housing;
   a build chamber disposed within the housing;
   a recoater disposed within the build chamber;
   a build platform configured to receive the workpiece;
   a shaft mounted to the build platform;

an actuating mechanism engaged with the shaft such that the actuating mechanism is configured to move the shaft relative to the actuating mechanism; and an acoustic sensor in operable communication with the additive manufacturing system;

sensing, by the acoustic sensor, a sound level;

identifying, from the sensed sound level, an occurrence of a sonic pulse signal emitted by the actuating mechanism; and determining, by a controller, whether the sonic pulse signal emitted by the actuating mechanism is outside of a threshold range, wherein a sonic pulse signal that is outside the threshold range is indicative of at least one of the following: contact between the recoater and the workpiece, a drop of the shaft relative to the actuating mechanism, and an un-biding of two bound components of the actuating mechanism.

2. The method of claim 1, further comprising pausing the construction of the workpiece after contact between the recoater and the workpiece, the drop of the shaft relative to the actuating mechanism, or the un-biding of two bound components of the actuating mechanism is determined based on the sensed sonic pulse signal from the actuating mechanism.

3. The method of claim 2, further comprising logging the occurrence of the sonic pulse signal after the sonic pulse signal is determined to be over the threshold value.

4. The method of claim 2, further comprising adjusting the height of the build platform to account for a change in height of the build platform.

5. The method of claim 2, further comprising visually inspecting at least one of the workpiece, the build platform, and the actuating mechanism to determine if the at least one of the workpiece, the build platform, and the actuating mechanism is in an irregular state.

6. The method of claim 5, further comprising determining at least one of whether the workpiece is misshapen, whether the build platform is out of position, and whether a component of the actuating mechanism is misaligned.

7. The method of claim 1, wherein the sensor is mounted to at least one of the shaft, a sidewall of the housing, and a first surface of the build platform that is opposite from a second surface of the build platform that is in contact with the workpiece.

8. The method of claim 1, wherein the threshold range comprises a decibel range with lower and upper limits, wherein a maximum decibel level defines the upper limit of the decibel range, and wherein a sonic pulse signal with a measured decibel level greater than the upper limit of the decibel range is indicative of indicative of at least one of the following: contact between the recoater and the workpiece, the drop of the shaft relative to the actuating mechanism, and the un-biding of two bound components of the actuating mechanism.

9. The method of claim 1, wherein the threshold range comprises a frequency range with lower and upper limits, and wherein a sonic pulse signal with a measured frequency outside of the decibel range is indicative of at least one of the following: contact between the recoater and the workpiece, the drop of the shaft relative to the actuating mechanism, and the un-biding of two bound components of the actuating mechanism.

10. A system configured to monitor an additive manufacturing operation, the system comprising:

a housing;

a build chamber disposed within the housing;

a recoater disposed within the build chamber;

a build platform configured to receive a workpiece;

a shaft mounted to the build platform;

an actuating mechanism engaged with the shaft such that the actuating mechanism is configured to move the shaft relative to the actuating mechanism; and an acoustic sensor mounted to another component of the system, wherein the system is configured to identify an occurrence of a sonic pulse signal emitted by the actuating mechanism and to determine whether the sonic pulse signal emitted by the actuating mechanism is outside of a threshold range, wherein a sonic signal that is outside of the threshold range comprises a level indicative of at least one of the following: contact between the recoater and the workpiece, a drop of the shaft relative to the actuating mechanism, and an un-biding of two bound components of the actuating mechanism, wherein the threshold range comprises a decibel range with lower and upper limits, wherein a maximum decibel level defines the upper limit of the decibel range, and wherein a sonic pulse signal with a measured decibel level greater than the upper limit of the decibel range is indicative of at least one of the following: contact between the recoater and the workpiece, a drop of the shaft relative to the actuating mechanism, and an un-biding of two bound components of the actuating mechanism.

11. The system of claim 10, further comprising a controller that is in electric communication with the recoater, the actuating mechanism, and the acoustic sensor.

12. The system of claim 11, wherein the controller determines whether the sonic pulse signal emitted by the actuating mechanism is outside of the threshold range.

13. The system of claim 10, wherein the acoustic sensor is mounted to at least one of the shaft, a sidewall of the housing, and a first surface of the build platform.

14. The system of claim 10, wherein the threshold range comprises a decibel range with lower and upper limits, wherein a maximum decibel level defines the upper limit of the decibel range, and wherein a sonic pulse signal with a measured decibel level greater than the upper limit of the decibel range is indicative of at least one of the following: contact between the recoater and the workpiece, the drop of the shaft relative to the actuating mechanism, and the un-biding of two bound components of the actuating mechanism.

* * * * *